United States Patent
Eisenhart et al.

(10) Patent No.: US 6,180,242 B1
(45) Date of Patent: Jan. 30, 2001

(54) LAMINATING ADHESIVE COMPOSITION

(75) Inventors: Eric Karl Eisenhart, Doylestown; Bradley Anson Jacobs, Chalfont; Louis Christopher Graziano, Warrington, all of PA (US)

(73) Assignee: Rohm and Haas Company, Philadelphia, PA (US)

( * ) Notice: Under 35 U.S.C. 154(b), the term of this patent shall be extended for 0 days.

(21) Appl. No.: 09/549,846

(22) Filed: Apr. 14, 2000

Related U.S. Application Data

(62) Division of application No. 08/198,336, filed on Feb. 18, 1994, now Pat. No. 6,087,425.

(51) Int. Cl.⁷ .............................. B32B 31/06; B32B 7/12; C08L 31/04; C08L 31/08
(52) U.S. Cl. ..................... 428/420; 428/424.4; 428/342; 428/351; 428/355 R; 428/355 AC; 428/511; 524/832; 524/833
(58) Field of Search .................................. 524/832, 833; 428/355 R, 355 AC, 351, 511, 342, 420, 424.4

(56) References Cited

U.S. PATENT DOCUMENTS

| | | |
|---|---|---|
| 3,668,170 | 6/1972 | Maruta et al. . |
| 3,708,388 | 1/1973 | Lindermann et al. . |
| 4,018,732 | 4/1977 | Lakshmanan . |
| 4,020,029 | 4/1977 | Gorbunow . |
| 4,316,830 | 2/1982 | Mallon . |
| 4,617,343 | 10/1986 | Walker et al. . |
| 5,480,720 * | 1/1996 | Eisenhart et al. ................. 428/414 |

FOREIGN PATENT DOCUMENTS

| | | |
|---|---|---|
| 1141895 | 2/1983 | (CA) . |
| 1274644 | 9/1990 | (CA) . |
| 2085206 | 6/1993 | (CA) . |

OTHER PUBLICATIONS

Handbook of Adhesives, Third Edition, Irving Skeist, Ph.D., Skeist Inc., Whippany, NJ, pp. 437–449.

* cited by examiner

*Primary Examiner*—James J. Seidleck
*Assistant Examiner*—Olga Asinovsky
(74) *Attorney, Agent, or Firm*—Stephen T. Falk

(57) ABSTRACT

An aqueous adhesive composition for wet lamination of substrate layers to form a laminated article includes from about 40 weight percent to about 65 weight percent solids dispersed in an aqueous medium, wherein the solids include a polymer having repeating units derived from a vinyl ester monomer and having a glass transition temperature of about $-15°$ C. to about $+15°$ C.; and from about 0.1 parts by weight to about 40 parts by weight of a plasticizer compound per 100 parts by weight of the polymer. A method for making a laminated article includes applying a wet layer of the aqueous laminating adhesive composition of the to a first substrate layer; covering the wet layer of adhesive composition with a second substrate layer; and drying the layer of adhesive composition to form the laminated article. A laminated article includes two substrate layers bonded together by an interposed layer of the dried adhesive composition.

3 Claims, No Drawings

US 6,180,242 B1

LAMINATING ADHESIVE COMPOSITION

This is a divisional application of Ser. No. 08/198,336, filed Feb. 18, 1994 now U.S. Pat. No. 6,087,425.

TECHNICAL FIELD

The present invention is directed to laminating adhesive compositions and, more particularly, to aqueous laminating adhesive compositions based on vinyl ester/acrylic copolymers for wet lamination of substrates.

BACKGROUND

There is a constant effort in the adhesives art to develop aqueous laminating adhesive compositions for wet lamination of substrates, for example packaging materials such as cardboard, that provide improved adhesion without requiring the addition of volatile organic solvents.

SUMMARY OF THE INVENTION

An aqueous adhesive composition is disclosed. The adhesive composition includes from about 30 weight percent to about 65 weight percent solids dispersed in an aqueous medium, wherein the solids comprise a polymer having repeating units derived from a vinyl ester monomer and having a glass transition temperature of about −15° C. to about +15° C. and from about 0.1 parts by weight to about 40 parts by weight of a plasticizer compound per 100 parts by weight of the polymer.

A laminated article is disclosed. The laminated article includes a first substrate layer, a second substrate layer and an adhesive layer interposed between the first and second substrate layers and bonding the first and second substrate layers together, wherein the adhesive layer comprises the solids portion of the above disclosed aqueous adhesive composition.

A method for making a laminated article wherein two substrate layers are bonded together by a dried layer of adhesive composition is disclosed. The method includes applying a wet layer of the above-described aqueous adhesive composition to a first substrate layer, covering the wet layer of adhesive composition with a second substrate layer and drying the layer of adhesive composition to form the laminated article.

DETAILED DESCRIPTION OF THE INVENTION

The adhesive composition of the present invention includes a polymer having a glass transition temperature ($T_g$) of about −15° C. to about +15° C.

In a preferred embodiment, the polymer has a $T_g$ of about −15° C. to about 0° C.

In a highly preferred embodiment, the polymer has a $T_g$ of about −15° C. to about −5° C.

The polymer is made by polymerizing a monomer or a mixture of monomers to provide a polymer having repeating units derived from the monomer or the respective monomers of the mixture. The identity and relative amounts of the monomers of the mixture are selected, according to methods known in the art, so that the polymer produced by polymerizing the monomer mixture exhibits a $T_g$ in the desired range.

The $T_g$ of a polymer of a proposed composition may be estimated by methods known in the art such as, for example, by calculating the weighted average of the $T_g$ values for homopolymers derived from the respective monomers $M_1$, $M_2$, ... $M_n$, of the reaction mixture, according to equation (1):

$$T_{g(copolymer)} = \sum_{i=1}^{n} w_i T_{gi} \qquad (1)$$

wherein:
$T_g$(copolymer) is the glass transition temperature calculated for the copolymer
$w_i$ is the weight fraction of monomer $M_1$ in the copolymer
$T_{gi}$ is the glass transition temperature of the homopolymer of $M_i$.

The glass transition temperature of homopolymers may be found, for example, in "Polymer Handbook", edited by J. Brandrup and E. H. Immergut, Interscience Publishers.

The polymer includes repeating units derived from a vinyl ester monomer. Suitable vinyl ester monomers include, for example, vinyl acetate, vinyl propionate, vinyl neononanoate, vinyl neodecanoate, vinyl 2-ethylhexanoate, vinyl pivalate, vinyl versatate and mixtures thereof.

In one embodiment, the polymer is a vinyl ester homopolymer, that is, a polymer wherein all the repeating units are identical to each other, having repeating units derived from a vinyl ester monomer.

In an alternative embodiment, the polymer is a vinyl ester copolymer, that is, a polymer wherein the repeating units are not identical to each other, having repeating units derived from a mixture of vinyl ester monomers.

In a third embodiment, the polymer is a vinyl ester/acrylic copolymer and includes first repeating units derived from a vinyl ester monomer and second repeating units derived from a ($C_1$–$C_{12}$)alkyl (meth)acrylate monomer. As used herein the terminology "($C_1$–$C_{12}$)alkyl" denotes an alkyl substituent group having from 1 to 12 carbon atoms per group and the terminology "(meth)acrylate monomer" refers collectively to acrylate monomers and methacrylate monomers. Suitable ($C_1$–$C_{12}$)alkyl (meth)acrylate monomers include, for example, ethyl acrylate, butyl acrylate, 2-ethylhexyl acrylate, lauryl acrylate, methyl methacrylate, ethyl methacrylate, butyl methacrylate, isodecyl methacrylate, lauryl methacrylate and mixtures thereof. Preferably, the alkyl (meth)acrylate monomer is butyl acrylate or 2-ethylhexyl acrylate.

In a preferred embodiment, the polymer is a vinyl ester/acrylic copolymer that includes about 40 weight percent (wt %) to about 70 wt %, more preferably, about 40 wt % to about 60 wt %, repeating units each derived from a vinyl ester monomer and about 30 wt % to about 60 wt %, more preferably, about 40 wt % to about 60 wt %, repeating units each derived from a ($C_1$–$C_{12}$)alkyl (meth)acrylate monomer.

In a highly preferred embodiment, the polymer is a vinyl ester/acrylic copolymer includes up to about 10 wt%, more preferably up to about 5 wt %, third repeating units derived from a monoethylenically unsaturated polar monomer, provided that the vinyl ester/acrylic copolymer includes no more than 3 wt %, more preferably no more than 2 wt %, repeating units derived from a monoethylenically unsaturated carboxylic acid monomer. The terminology "monoethylenically unsaturated" means having a single site of ethylenic unsaturation per molecule. Suitable monoethylenically unsaturated polar monomers include, for example, ($C_1$–$C_8$)hydroxyalkyl (meth)acrylate monomers, wherein the terminology "($C_1$–$C_8$) hydroxyalkyl" denotes a hydroxyalkyl substituent group having from 1 to 8 carbon atoms per group, and monoethylenically unsaturated carboxylic acid monomers. Suitable hydroxyalkyl (meth)acrylate monomers include, for example, hydroxyethyl acrylate, hydroxyethyl methacrylate, hydroxybutyl acrylate, hydroxypropyl methacrylate, 1-methyl-2-hydroxyethyl methacrylate and mixtures thereof. Suitable monoethylenically unsaturated carboxylic acid monomers include, for example, acrylic acid, methacrylic acid, itaconic acid, crotonoic acid, fumaric acid and mixtures thereof.

In a preferred embodiment, the polymer vinyl ester/acrylic copolymer that includes from about 0.1 wt % to about 10 wt % third repeating units derived from a monoethylenically unsaturated polar monomer. More preferably, the vinyl ester/acrylic copolymer includes from about 0.5 wt % to about 2 wt % third repeating units derived from a monoethylenically unsaturated carboxylic acid monomer.

The vinyl ester/acrylic copolymer may, optionally, be pre-crosslinked, that is crosslinked during synthesis of the copolymer, by including a small amount, for example, about 0.01 wt % to about 5 wt %, of a polyethylenically unsaturated monomer in the monomer mixture, wherein the terminology "polyethylenically unsaturated" means having two or more sites of ethylenic unsaturation per molecule. Suitable polyethylenically unsaturated monomers include, for example, allyl (meth)acrylate, diallyl phthalate, 1,4-butylene glycol di(meth)acrylate, trimethylolpropane tri(meth)acrylate, divinyl ketone, N, N'-methylenediacrylimide, the polyallyl and polyvinyl ethers of pentaerythritol and mixtures thereof.

The polymer is made, for example, by free radical-initiated emulsion polymerization of a monomer or monomer mixture.

In a preferred embodiment, the polymer is made by an aqueous emulsion polymerization wherein a discontinuous monomer phase is dispersed in a continuous aqueous phase and polymerized in the presence of a colloidal stabilizer, for example, hydroxyethyl cellulose, carboxymethyl cellulose, poly(vinyl alcohol), partially hydrolyzed poly(vinyl alcohol), fully hydrolyzed poly(vinyl alcohol), gum arabic or a mixture thereof.

In a preferred embodiment, the monomer to be polymerized is continuously fed into the reaction vessel as the polymerization reaction progresses.

In a highly preferred embodiment, the polymer is made by an aqueous emulsion polymerization carried out in the presence of colloidal stabilizer.

Preferably, the polymerization is carried out using from about 0.05 pbw to about 10 pbw colloidal stabilizer per 100 pbw total monomers. The terminology "total monomers" means the total amount of monomers introduced into the reaction vessel in the course of the polymerization reaction. In the preferred embodiment wherein the monomer is fed into the reaction vessel as the reaction progresses, it is preferred that the colloidal stabilizer be continuously fed into the reaction vessel.

In a highly preferred embodiment, the colloidal stabilizer is poly(vinyl alcohol), partially hydrolyzed poly(vinyl alcohol), fully hydrolyzed poly(vinyl alcohol) or a mixture thereof.

Optionally, an anionic surfactant, a nonionic surfactant or a mixture thereof may be used in addition to the colloidal stabilizer to stabilize the aqueous reaction mixture and the product emulsion. For example, up to about 5 pbw per 100 pbw total monomer charge of an anionic surfactant such as, for example, alkyl sulfates, alkyl sulfonates, alkyl phenol ethoxysulfates, monoalkyl sulfosuccinates or a mixture thereof, or up to about 10 pbw per 100 pbw total monomer charge of a nonionic surfactant such as, for example, ethoxy-lated alkyl phenols, poly(ethylene oxide/propylene oxide) block copolymers or a mixture thereof may be used in addition to the colloidal stabilizer.

The molecular weight of the polymer may, optionally, be controlled in a conventional manner using a chain transfer agent. For example, up to about 10 wt %, more preferably, up to about 0.75 wt %, based on weight of total monomer charge, of a chain transfer agent, for example, a $(C_2-C_{20})$ alkyl mercaptan such as, for example, octyl mercaptan and dodecyl mercaptan, esters of mercaptopropionic acid such as, for example, methyl-3-mercaptopropionate and butyl-3-mercaptopropionate or a mixture thereof, may be introduced into the reaction vessel during the polymerization reaction. In a preferred embodiment, the chain transfer agent is dodecyl mercaptan or methyl-3-mercaptopropionate.

In a preferred embodiment, the polymer is in the form of an aqueous emulsion that includes from about 30 wt % to about 70 wt %, more preferably about 45 wt % to about 60 wt %, polymer solids.

In a preferred embodiment, the polymer solids are in the form of particles of about 100 nanometers to about 4000 nanometers in diameter.

In a preferred embodiment, the polymer emulsion has a viscosity of about 100 centipoise (cP) to about 10,000 cP, more preferably about 200 cP to about 7500 cP. the viscosity of the emulsion may be conveniently measured using a Brookfield viscometer, for example, using a Brookfield Model No. LVT viscometer equipped with a #3 spindle and operated at 12 revolutions per minute.

The adhesive composition of the present application includes the above described polymer and a plasticizer compound.

Suitable plasticizer compounds include, for example, phthalates such as dibutyl phthalate, benzoate derivatives such as diethylene glycol dibenzoate, dipropylene glycol dibenzoate, esters of dicarboxylic acids such as esters of $(C_2-C_6)$alcohols, for example, ethanol, with adipic acid or succinic acid and low molecular weight polar organic compounds such as, for example, methanol, 1,1,1-trichloroethane.

In a preferred embodiment, the plasticizer is a mixture of diethylene glycol dibenzoate and dipropylene glycol dibenzoate.

The adhesive composition of the present invention includes about 40 wt % to about 65 wt % solids dispersed in water.

The solids of the adhesive composition include the polymer and about 0.1 parts by weight (pbw) to about 40 pbw plasticizer per 100 pbw polymer.

In a preferred embodiment, the solids of the adhesive composition include from about 40 wt % to about 99.9 wt % polymer solids and from about 0.1 wt % to about 60 wt % plasticizer solids. More preferably, the solids of the adhesive composition include from about 60 wt % to about 99 wt % polymer solids and from about 1 wt % to about 40 wt % plasticizer solids.

The adhesive composition may, optionally, further include other additives known in the art such as, for example, emulsifiers, pigments, fillers, curing agents, thickeners, humectants, wetting agents, biocides, adhesion promoters, colorants, waxes and antioxidants.

In a preferred embodiment, the adhesive composition of the present invention is made by adding the plasticizer and any other components of the adhesive composition to an aqueous emulsion of the polymer and agitating the combination to form a substantially uniform emulsion.

The plasticizer content of the adhesive composition of the present invention has an unexpectedly dramatic effect on the viscosity of the adhesive composition, that is, the viscosity of the adhesive composition made by adding a relatively small amount of plasticizer to an emulsion of the above disclosed polymer is dramatically higher, for example, a factor of 3 to 10 times higher than the initial viscosity of the emulsion. In contrast, an analogous adhesive composition based on a polymer having a $T_g$ below −15° C. would be expected to exhibit a viscosity that is higher than the initial viscosity of the polymer emulsion by a factor of less than 3.

The dramatic viscosity response of the adhesive composition of the present invention is beneficial in that the composition provides equivalent performance at a lower solids level, that is, can be applied in a state wherein the composition is more highly diluted with water, than an adhesive composition based on an analogous polymer having a $T_g$ less than −15° C.

In a preferred embodiment, the adhesive composition of the present invention has a viscosity of from about 100 cP to about 10,000 cP, and, more preferably, of from about 200 cP to about 7,500 cP.

The adhesive composition of the present invention is useful for bonding substrates together. The adhesive composition is particularly useful for wet lamination of a plurality of substrate layers, that is, a bonding method wherein layer of the adhesive composition is applied to a first substrate layer, the wet adhesive layer is covered with a second substrate layer and the adhesive layer is then dried to form a laminated article wherein the two substrates are bonded together by the dried adhesive layer. In a preferred embodiment, the substrate layers are in the form of flat sheets of substrate material.

The adhesive composition of the present invention may be applied to a substrate to be bonded by known techniques such as, for example, roll coating, wire-wound rod coating, knife coating, gravure printing and curtain coating.

Suitable substrates include, for example, paper products such as papers and paperboards, wood, metal films, polymer films and composite substrates, that is, substrates consisting of a combination of dissimilar substrate materials such as polymer-coated paperboards, for example, wax-coated paperboard, and wood products, for example, particle board.

EXAMPLE 1

A monomer mixture consisting of 200 g butyl acrylate, 592 g vinyl acetate, 8 g acrylic acid, 118.8 g of a 20.2 wt % solution of partially hydrolyzed poly(vinyl alcohol) (Airvol 205, Air Products, Allentown, Pa.) in water and 217.2 g DI water was made.

A stirred reaction vessel containing 208.3 grams (g) deionized (DI) water and 12.0 g surfactant (ethoxylated octylphenol having 10 moles ethylene oxide per molecule, Triton X-100, Union Carbide, Danbury, Conn.) was heated to 65° C. under nitrogen. Then 0.8 g of a 1.0 wt % iron (II) sulfate solution in water, followed by 0.2 g of an aqueous 30 wt % solution of hydrogen peroxide dissolved in 2.0 g DI water, were each added to the reaction vessel.

Three separate feed streams were simultaneously introduced and concurrently fed into the reaction vessel:
  the monomer mixture was fed into the reaction vessel at a substantially uniform rate over a time period of 165 minutes;
  a solution of 1.6 g of 30 wt % hydrogen peroxide dissolved in 39.8 g DI water was fed into the reaction vessel at a substantially uniform rate over a time period of 180 minutes; and
  a solution of 0.8 g of sodium sulfoxylate formaldehyde dissolved in 421.0 g DI water was fed into the reaction vessel at a substantially uniform rate over a time period of 180 minutes.

At the completion of the monomer mixture feed stream, 12 g of DI water were added to the reaction vessel.

The contents of the reaction vessel were cooled to room temperature upon completion of the hydrogen peroxide and the sodium sulfoxylate formaldehyde feed streams.

The pH of the contents of the reaction vessel was then adjusted to a value of 3.4 using a 15 wt % solution of sodium carbonate in water and the solids content of the reaction vessel was adjusted to a nominal, that is, determined by calculation, value of 55 wt % by adding DI water to the reaction vessel.

The product emulsion so formed had a solids content of 54.6 wt % and a viscosity of 800 centipoise (measured using a Brookfield RVT viscometer equipped with a #6 spindle at 10 revolution per minute).

The $T_g$ of the copolymer of the product emulsion was estimated according to the relationship set forth above as equation (1) to be 11.2° C.

EXAMPLES 2–10

The polymer emulsions of Examples 2–10 were each made by the process described above in Example 1, except that different relative amounts of monomers were used and, in Example 10, a chain transfer agent was added to the reaction mixture to limit the molecular weight of the polymer formed by the process.

The respective glass transition temperatures of the polymers formed in Examples 3 and 6–10 were measured using a Differential Scanning Calorimeter (Model TA 2910, TA Instruments, New Castle, Del.) according to the following procedure. A polymer sample was heated from room temperature to 150° C. at a rate of 20° C. per minute (° C./min). The sample was held at 150° C. for 5 minutes and then rapidly cooled to −100° C. The sample was then reheated to 150° C. at 20° C./min while data was collected. The reported $T_g$ is the value at half-height of the glass transition curve.

The respective $T_g$s of the polymers formed in Examples 1, 2,4 and 5 were each estimated according to the relationship set forth above as equation (1).

The relative amounts of following monomers: butyl acrylate (BA), vinyl acetate (VAC), acrylic acid (AA), 2-ethylhexyl acrylate (EHA), methyl acrylate (MA), ethyl acrylate (EA) and isobutyl acrylate (IBA), and chain transfer agent (dodecyl mercaptan (DDM)) used to make each of the respective copolymers of Examples 1–10 are set forth below in TABLE 1.

TABLE 1

| EX # | BA | VAC | AA | EHA | MA | EA | IBA | DDM |
|---|---|---|---|---|---|---|---|---|
| 1 | 25 | 74 | 1 | 0 | 0 | 0 | 0 | 0 |
| 2 | 49.5 | 49.5 | 1 | 0 | 0 | 0 | 0 | 0 |
| 3 | 56 | 43 | 1 | 0 | 0 | 0 | 0 | 0 |
| 4 | 0 | 55 | 1 | 44 | 0 | 0 | 0 | 0 |
| 5 | 50 | 44 | 1 | 5 | 0 | 0 | 0 | 0 |
| 6 | 0 | 22 | 1 | 0 | 0 | 77 | 0 | 0 |
| 7 | 40 | 22 | 1 | 0 | 37 | 0 | 0 | 0 |
| 8 | 0 | 46 | 1 | 0 | 0 | 0 | 53 | 0 |
| 9 | 56 | 44 | 0 | 0 | 0 | 0 | 0 | 0 |
| 10 | 49.5 | 49.5 | 1 | 0 | 0 | 0 | 0 | 0.2 |

The adhesion of each of the polymer emulsions of Examples 1 to 10 to wax-coated cardboard was determined by the method disclosed below.

Cardboard(200 pounds per square inch burst strength) was coated with a wax-based coating (Coating 40E, Michelman, Inc., 9080 Shell Road, Cincinnati, Ohio. using a #6 wire-wound rod. The coated board was cured at 105° C. for 1 minute and then allowed to equilibrate in a controlled environment (25° C. and 50% relative humidity) overnight. The wax-coated cardboard was then cut into 2 inch by 4 inch coupons.

A line of polymer emulsion (about 5 g adhesive) was applied along one of the 2 inch wide ends of each of the wax-coated coupons and then drawn down the length of the coupon using a notched stainless steel blade (5 notches per inch, with each notch being about 1/32 inch wide by 1/16 inch deep). A coupon of virgin cardboard, that is, a cardboard coupon having no wax coating and having no emulsion coating, was applied to the wet emulsion-coated side of the coated coupon and a 1 kilogram weight was applied for 4 minutes to compress the combined coupons and adhesive composition. The coupons were then peeled by hand and the amount of fibers torn from the wax-coated coupon was determined visually. The adhesion values reported below in Table 2 are averages based on the fiber tear results for 10 samples.

The adhesion results obtained with the emulsions of Examples 1–10 were compared with those obtained using an emulsion of a vinyl ester/acrylic copolymer (Comparative Example C1) that is commercially available as Rovace HP-2931 copolymer emulsion from Rohm and Haas Company.

The polymer solids content, expressed as a weight percent (wt %), the viscosity, expressed in centipoise (cP), a $T_g$ value, expressed in degrees centigrade (° C.) and an adhesion value, expressed as percentage of fibers torn from the wax-coated coupon (%), are set forth below in TABLE 2 for each of the respective emulsions of Examples 1–10 and for Comparative Example C1.

TABLE 2

| Example # | Solids Content (wt %) | Viscosity (cP) | Tg (° C.) | Adhesion (%) |
|---|---|---|---|---|
| 1 | 54.6 | 700 | 11.2* | — |
| 2 | 55.1 | 910 | −9.8* | 70 |
| 3 | 55.3 | 1400 | −7 | 80 |
| 4 | 55.4 | 690 | −12.4* | 60 |
| 5 | 55.3 | 780 | −14.4* | 70 |
| 6 | 54.8 | 2990 | 0.6 | 20 |
| 7 | 54.6 | 1110 | 0 | 30 |
| 8 | 54.6 | 580 | 10 | 0 |
| 9 | 55.4 | 1000 | −6.8 | 30 |
| 10 | 54.8 | 1210 | −0.8 | 60 |
| C1** | — | 2090 | −25 | 80 |

*Tg estimated according to equation (1)
**Rovace HP-2931, Rohm and Haas Company

EXAMPLES 11–20 and COMPARATIVE EXAMPLES C1–C3

A benzoate plasticizer (50/50 blend of diethylene glycol dibenzoate and dipropylene glycol dibenzoate, (Benzoflex 50, Velsicol, Rosemont, Ill.) was added to each of the emulsions of Examples 1–10 and C1.

The mixtures so formed were then allowed to equilibrate overnight. The viscosity of each of the mixtures was then measured with a #3 spindle and operated at 12 revolutions per minute. The effect of the plasticizer on the viscosity of each of the respective mixtures was characterized by calculating a viscosity response factor (VR) according to the relationship:

VR=100(adhesive composition viscosity/emulsion viscosity)

for each of the respective adhesive compositions.

The polymer emulsion used (Emulsion Example #), the amount of plasticizer added to form the mixture, expressed as parts by weight plasticizer per 100 parts by weight emulsion (pbw/100 pbw emulsion), the viscosity of the emulsion/plasticizer mixture, expressed in centipoise (cP) and the viscosity response factor exhibited by the mixture is reported below in Table 3 for each of the respective emulsion/plasticizer mixtures.

TABLE 3

| Emulsion/ Plasticizer Mixture EX #/ | Emulsion EX # | Plasticizer (pbw/100 pbw emulsion) | Viscosity (cP) | Viscosity Response Factor |
|---|---|---|---|---|
| 11 | 1 | 10 | 3820 | 550 |
| 12A | 2 | 5 | 2000 | 220 |
| 12B | 2 | 10 | 4800 | 530 |
| 13A | 3 | 5 | 4000 | 290 |
| 13B | 3 | 10 | 9500 | 680 |
| 14A | 4 | 5 | 1420 | 210 |
| 14B | 4 | 10 | 3400 | 490 |
| 15 | 5 | 10 | 3650 | 470 |
| 16A | 6 | 5 | 6600 | 220 |
| 16B | 6 | 10 | 18000 | 600 |
| 17A | 7 | 5 | 3000 | 270 |
| 17B | 7 | 10 | 7310 | 660 |
| 18A | 8 | 5 | 1520 | 260 |
| 18B | 8 | 10 | 3580 | 620 |
| 19 | 9 | 10 | 6000 | 600 |
| 20A | 10 | 5 | 4250 | 350 |
| 20B | 10 | 10 | 7100 | 590 |
| C2 | C1 | 5 | 2580 | 120 |
| C3 | C1 | 10 | 4180 | 200 |

EXAMPLES 21 and 22A–22C

Examples 21 and 22A–22C illustrate the effect of added plasticizer on adhesion.

Example 21 was an emulsion of a polymer having the same composition as that in the emulsion of Example 3 described above.

The adhesive compositions of Examples 22A–22C were made by adding plasticizer and water to samples of the emulsion of Example 21.

The viscosity and adhesion to wax coated cardboard were measured for each of the Examples 21 and 22A–22C according to the method described above in Examples 11–20 and C1–C4.

The amount of added plasticizer, expressed as parts by weight plasticizer per 100 parts by weight emulsion (Plasticizer (pbw/100 pbw emulsion)), the amount of added water, expressed as parts by weight water per 100 parts by weight emulsion (H$_2$O (pbw per 100 pbw emulsion)), the solids content of the emulsion/plastidzer/water mixture, expressed as a percent (solids; (%)), the viscosity of the emulsion/plasticizer/water mixture, expressed in centipoise (Viscosity; (cP)) and the adhesion of the emulsion/plasticizer/water mixture to wax-coated cardboard, expressed as a percentage (Adhesion; (%)) are set forth below in TABLE 4 for Examples 21 and 22A–22C.

TABLE 4

| Example # | Plasticizer (pbw/100 pbw emulsion) | H₂O (pbw/100 pbw emulsion + plasticizer) | Solids (wt %) | Viscosity (cP) | Adhesion (%) |
| --- | --- | --- | --- | --- | --- |
| 21 | 0 | 0 | 56.3 | 1060 | 60 |
| 22A | 5 | 1.2 | 57.8 | 1820 | 70 |
| 22B | 10 | 3.3 | 58.4 | 2120 | 80 |
| 22C | 15 | 5.5 | 58.9 | 2430 | 80 |

EXAMPLES 23–25

An experiment was performed to determine the amount of added water required to bring the viscosity of a mixture of plasticizer and polymer emulsion back to that of the neat emulsion (this method normalizes for differences in neat viscosity of the emulsions used).

Example 23 was an emulsion of a polymer having the same composition as that in the emulsion of Example 3 described above.

Plasticizer (10 parts by weight Benzoflex 50 per 100 parts by weight emulsion) was added to a sample of the emulsion of Comparative Example C1 to form the mixture of Example C4 and to a sample of the emulsion of Example 23 to form the mixture of Example 24.

The emulsion used to form the mixture (Example #), the solids content of the emulsion used (%), the viscosity of the emulsion used, expressed in centipoise (cP), the viscosity of the mixture of emulsion and plasticizer (cP), the viscosity response factor exhibited by the mixture of emulsion and plasticizer, the amount of water added to bring the viscosity of the mixture of emulsion and plasticizer back to the viscosity of the emulsion, expressed as parts by weight water per 100 parts by weight emulsion (H₂O added (pbw/100 pbw emulsion)) and the viscosity of the emulsion/plasticizer/added water mixture (cP) are each set forth below in TABLE 5 for Example 24 and Comparative Example C4.

TABLE 5

|  | Plasticizer/Emulsion Mixture Ex # C4 | Plasticizer/Emulsion Mixture Ex # 24 |
| --- | --- | --- |
| Emulsion Example # | C1 | 23 |
| Emulsion Solids (%) | 54.8 | 55.8 |
| Emulsion Viscosity (cP) | 2950 | 870 |
| Emulsion/Plasticizer Viscosity (cp) | 5900 | 4480 |
| Viscosity Response Factor | 200 | 510 |
| H₂O added (pbw per 100 pbw Emulsion) | 2.1 | 510 |
| Emulsion/Plasticizer/H₂O Viscosity (cP) | 3070 | 810 |

The combination of a plasticizer and an emulsion of a polymer having repeat units derived from a vinyl ester monomer and having a $T_g$ from about −15° C. to about +15° C. provides an adhesive composition that may be more highly diluted with water than those based upon lower $T_g$ polymers, thereby reducing the amount of polymer and associated cost required to provide a high level of performance.

We claim:

1. A laminated article, comprising a first substrate, a second substrate layer and an adhesive layer interposed between the first and second substrate layers and bonding the first and second substrate layers together, wherein the adhesive layer comprises a polymer having first repeating units derived from a vinyl ester monomer, having second repeating units derived from a $(C_1–C_{12})$alkyl (meth)acrylate monomer and having a glass transition temperature of −15° C. to about +15° C.; and from about 0.1 parts by weight to about 40 parts by weight per 100 parts by weight of the polymer of a plasticizer compound.

2. The article of claim 1, wherein the first and second substrate layers are each independently selected from the group consisting of polymer films, metal films, papers, paperboards, coated papers, coated paperboards and wood.

3. The article of claim 2, wherein the first and second substrate layers are each independently paperboard or coated paperboard.

* * * * *